(12) United States Patent
Tamaki et al.

(10) Patent No.: US 7,555,269 B2
(45) Date of Patent: Jun. 30, 2009

(54) ADAPTIVE MODULATION SCHEME AND CODING RATE CONTROL METHOD

(75) Inventors: Satoshi Tamaki, Kokubunji (JP); Takashi Yano, Tokorozawa (JP); Seishi Hanaoka, Tokyo (JP); Toshiyuki Saito, Kokubunji (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 475 days.

(21) Appl. No.: 11/333,199

(22) Filed: Jan. 18, 2006

(65) Prior Publication Data

US 2006/0165189 A1   Jul. 27, 2006

(30) Foreign Application Priority Data

Jan. 21, 2005   (JP) .............................. 2005-013469

(51) Int. Cl.
*H04B 1/02* (2006.01)
*H04L 27/00* (2006.01)

(52) U.S. Cl. ...................................... 455/102; 375/260

(58) Field of Classification Search .................. 455/23, 455/42, 102, 108, 205, 296; 375/259, 260, 375/261, 268, 271, 295, 298, 300, 302, 316, 375/322, 324, 353; 370/335, 342, 441
See application file for complete search history.

(56) References Cited

U.S. PATENT DOCUMENTS

| | | | | |
|---|---|---|---|---|
| 5,596,604 A | * | 1/1997 | Cioffi et al. | 375/260 |
| 6,266,347 B1 | * | 7/2001 | Amrany et al. | 375/220 |
| 6,747,992 B1 | * | 6/2004 | Matsumoto | 370/468 |
| 2005/0054302 A1 | | 3/2005 | Hanaoka et al. | |

(Continued)

OTHER PUBLICATIONS

U.S. Appl. No. 10/926,143, filed Aug. 26, 2004, Tamaki et al.

(Continued)

*Primary Examiner*—Quochien B Vuong
(74) *Attorney, Agent, or Firm*—Antonelli, Terry, Stout & Kraus, LLP.

(57) ABSTRACT

A radio communication system for enabling control of a modulation scheme following variation in the propagation channel and control of a coding rate in a small amount of delay and arithmetic operation. In order to attain the object explained above, a transmitter station and a receiver station use in common the information of the maximum number of bits used for communication of each symbol. The transmitter station generates codeword by previously encoding the communication signal with the code having sufficient error correcting capability, assigns, to each symbol, the codeword to result in the maximum number of bits per symbol, and modulates and transmits the bits using the modulation scheme in which the number of bits per symbol is equal to or less than the maximum number of bits per symbol. Meanwhile, the receiver station demodulates, for each symbol, the bits with the modulation scheme, in which the number of bits per symbol is larger as the propagation channel quality is higher, among the modulation schemes in which the number of bits per symbol is less than the maximum number of bits per symbol and summarizes the demodulation results and executes the decoding process by adding the signal of zero likelihood to restore the shortage when the total sum of the number of bits per symbol in the modulation scheme used for the demodulation becomes equal to or larger than the predetermined value.

9 Claims, 9 Drawing Sheets

U.S. PATENT DOCUMENTS

2005/0054319 A1  3/2005  Tamaki et al.
2005/0197065 A1  9/2005  Tamaki et al.

OTHER PUBLICATIONS

U.S. Appl. No. 11/066,185, filed Feb. 25, 2005, Tamaki et al.

Shinya Otsuki, et al. IEEE Global Telecommunications Conference 1995 Proceedings vol. 1537-41.

"cdma2000 High Rate Packet Data Air Interface specification", 3GPP2 C. S0024-a Version 1.0, pp. 14-21 to 14-23, 14-60 to 14-64, Mar. 2000.

* cited by examiner

FIG. 9

ADAPTIVE MODULATION SCHEME AND CODING RATE CONTROL METHOD

CLAIM OF PRIORITY

The present application claims priority from Japanese application JP 2005-013469 filed on Jan. 21, 2005, the content of which is hereby incorporated by reference into this application.

FIELD OF THE INVENTION

The present invention relates to a modulation scheme adapted to variable channel quality and a coding rate control method of channel code in a radio communication system in which propagation channel quality changes from time to time.

BACKGROUND OF THE INVENTION

A multi-level modulation technology is well known as a scheme for propagating a plurality of bits per symbol in view of increasing propagation amount per time in the radio communication system. In the multi-level modulation technology, as the more the number of bits per symbol increases, the more the maximum throughput under the good propagation channel quality. However, a problem arises that an error may be generated easily when propagation channel quality is lowered, and thereby the throughput is remarkably lowered. Therefore, in order to ensure a stable communication, an adaptive modulation technology has been proposed, in which a modulation scheme is switched in accordance with propagation channel quality, namely a modulation multi-level value is set to a higher value when the propagation channel quality is high and the modulation multi-level value is set to a lower value when the propagation channel quality is low. This adaptive modulation technology has been explained in the "Modulation Level Controlled Adaptive Modulation System with Base-Station-Based Transmission/Reception Diversity Scheme for Personal Communications" Shinya Otsuki, et al., IEEE Global Telecommunications Conference 1995 Proceedings Vol. 1537-41) or the like.

In addition to the modulation scheme in accordance with the propagation channel quality, a technology has also be proposed in which communication can be made with the throughput in accordance with the propagation channel quality by switching a coding rate of channel code. This technology has been introduced, for example, to a system of the standard specification, 3RD GENERATION PARTNERSHIP PROJECT 2, "cdma2000 High Rate Packet Data Air Interface specification", 3GPP2 C. S0024-A Version 1.0, pp 14-21 to 14-23, 14-60 to 14-64, March 2000). Further, the system described in this non-patent document utilizes the technology called HARQ (Hybrid Automatic Repeat reQuest) in which a transmitter station previously encodes signals in lower encoding rate and transmits a part of the encoded signals, while a receiver station decodes the received signals, moreover, when the channel decoding is completed in successful, the transmitter station terminates transmission, if channel decoding fails here, the transmitter station transmits again another part of the encoded signals and the receiver station conducts channel decoding by combining this received signal with the signals received previously, whereby communication can be made in the throughput in accordance with the propagation channel by adjusting the encoding rate in accordance with the actual propagation channel quality.

SUMMARY OF THE INVENTION

In general, since a large amount of arithmetic operations are required for channel decoding process of the channel code, a problem is generated in the HARQ system described above, in which arithmetic operation processing capability required for the receiver station becomes higher because the channel decoding process is required for each reception of a part of the encoded signals in the receiver station. Moreover, the HARQ system also has problems that an interval of transmissions in the transmitter station becomes longer and thereby delay of signal increases because whether re-transmission in the transmitter station is necessary or not must be decided after termination of channel decoding process? in the receiver station. Moreover, this HARQ system also has a problem that capacity of storage element required to hold the signals which are delayed to a large extent also increases.

The present invention has been proposed to solve the problems explained above and it is therefore an object of the present invention to provide an adaptive modulation scheme and a coding rate control method in a radio communication system in which a receiver station is not required to have large arithmetic operation capability by controlling an effective modulation multi-level value in accordance with propagation channel quality and by controlling coding rate without necessity of trial repetitive processes at the receiver station.

In the adaptive modulation scheme of the present invention as a means for solving the problems explained above, a transmitter station and a receiver station have in common information of the maximum bit numbers for communication per symbol, the transmitter station generates a codeword by encoding a communication signal with the code having sufficient error correcting capability, assigns the codeword to result in the maximum number of bits per symbol, and modulates and transmits the bits with the modulation scheme in which the number of bits per symbol is equal to or less than the maximum number of bits per symbol, and the receiver station performs, to each symbol, demodulation corresponding to a modulation scheme in which the number of bits per symbol is larger as the propagation channel quality is higher among the modulation schemes in which the number of bits per symbol is equal to or less than the maximum number of bits per symbol, conducts channel decoding by summarizing results of the demodulation when the total number of bits per symbol of the modulation scheme used for the demodulation becomes equal to or larger than the predetermined value, and sends termination of transmission of the relevant codeword to the transmitter station. Accordingly, control of modulation scheme and coding rate in accordance with propagation channel quality is realized without necessity of trial repetitive channel decoding processes in the receiver station.

According to the present invention, there is provided the adaptive modulation scheme and the coding rate control method which enable control of modulation scheme and coding rate in accordance with the propagation channel quality without the necessity of the trial repetitive channel decoding processes in the receiver station.

DETAILED DESCRIPTION OF THE PREFERRED EMBODIMENTS

The preferred embodiments of the present invention will be explained with reference to the accompanying drawings.

An adaptive modulation scheme will be explained below as an example where the maximum number of bits per symbol is set to six bits and 64 QAM or 16 QAM or QPSK is used as a modulation scheme. The present invention is not limited only to these maximum number of propagation bits and modulation scheme and can also be adapted in general to the case where the maximum number of propagation bits per symbol is set to 2m bits and channel decoding is conducted with $2^{2k}$QAM (k is a natural number of m or less) as the modulation scheme. Moreover, 4 QAM which corresponds to the case where k is equal to 1 in above explanation indicates the modulation scheme identical to that of QPSK. Moreover, the modulation scheme to which the present invention can be adapted corresponds in general to the modulation scheme which enables communication of 2 bits or more per symbol of the modulation symbol. This modulation scheme is enough when it can identify at least one bit under the condition that non-identified bits exist on the occasion of the channel decoding. In addition to the modulation scheme indicated as the example, this modulation scheme can be adapted to an example of $2^k$PSK (k is a natural number of m or less) where the maximum number of propagation bits is set to m bits, and also to the modulation scheme such as $2^k$ASK (k is a natural number of m or less) where the maximum number of propagation bits is set to m bits.

Moreover, at the time of mapping information of a plurality of bits to signal points in the multi-level modulation, deviation may be generated in an error rate of every bit in accordance with the modulation scheme and mapping method. In the following explanation, when the deviation is generated in the error rate as explained above, the bits which are mapped to lower the error rate are called more significant bits of multi-level modulation, while the bits which are mapped to raise error rate are called less significant bits. Here, it is possible to call any one of the bits resulting in the identical error rate as the more significant bits or less significant bits.

Moreover, in the following description, the adaptive modulation scheme and the coding rate control method of the present invention are adapted to the signal transmitted to a second radio station from a first radio station to simplify the description and the first radio station is called the transmitter station and the second radio station is called the receiver station. Meanwhile, the adaptive modulation scheme and coding rate control method of the present invention can be adapted to signal propagation from the first radio station to the second radio station and that from the second radio station to the first radio station. In this case, the first and second radio station conduct signal processes of both transmitter station and receiver station which will be described later. Moreover, in the cellular communication and wireless LAN communication, any one of a base station, an access point, and a terminal device may be operated as the transmitter station or receiver station.

Moreover, as the propagation channel quality in the following description, any parameter can be used so long as it is a value having positive or negative relationship with an error rate, communication quality in signal communication, and mutual information amount or the like of transmitter station and receiver station such as, for example, receiving signal power intensity, interference power intensity, signal to interference and noise power ratio or the like. Namely, high propagation channel quality indicates the condition that receiving signal power is high or interference power intensity is low or signal to interference and noise power ratio is high or receiving signal power fluctuation is low or the like, and low propagation channel quality indicates the inverse condition.

In the following description, a signal used for estimating the propagation channel quality is called a pilot signal. The pilot signal has constant signal amplitude and phase during transmission or has a fixed pattern, and this pilot signal is used to estimate variation of signal amplitude and phase in the propagation channel from difference between the transmitted signal and received signal at the receiver station. For this purpose, not only the individual pilot signal for every communication between the transmitter station and receiver station but also the common pilot signal transmitted from a base station, for example, in cellular communication and a preamble or the like in the packet communication or the like may also be used. However, in the following description, the signals which may be used for such purpose will be called the pilot signals.

The adaptive modulation scheme and coding rate control method of the present invention will be described with reference to the accompanying drawings. In the present invention, a codeword generated by encoding the signal with a channel code is divided and is transmitted to the receiver station from the transmitter station in every division unit. This division unit is called a subframe in the following description. Moreover, in the drawings and following description, the number of bits assigned respectively to subframes generated by dividing the codeword at the transmitter station is defined as Nc, the number of bits which are actually used for modulation of each subframe at the transmitter station as Nt, and the number of bits obtained by demodulation of each subframe at the receiver station as Nr. For example, when the number of modulation symbols of each subframe is set to M and the maximum number of propagation bits per symbol which is fixed as the system or defined by the transmitter station and receiver station before data communication is set to 6, Nc can be obtained as product of M and 6. Moreover, when the modulation scheme of all symbols in the subframes at the transmitter station is set to 64 QAM, a value of Nt can be obtained as product of 6, which is the number of bits to be transmitted per symbol with 64 QAM, and M. In addition, all symbols in the subframes at the receiver station is demodulated with 16 QAM in the same manner, a value of Nr can be obtained as product 4, which is the number of bits to be transmitted per symbol with 16 QAM, and M.

Figure 9:
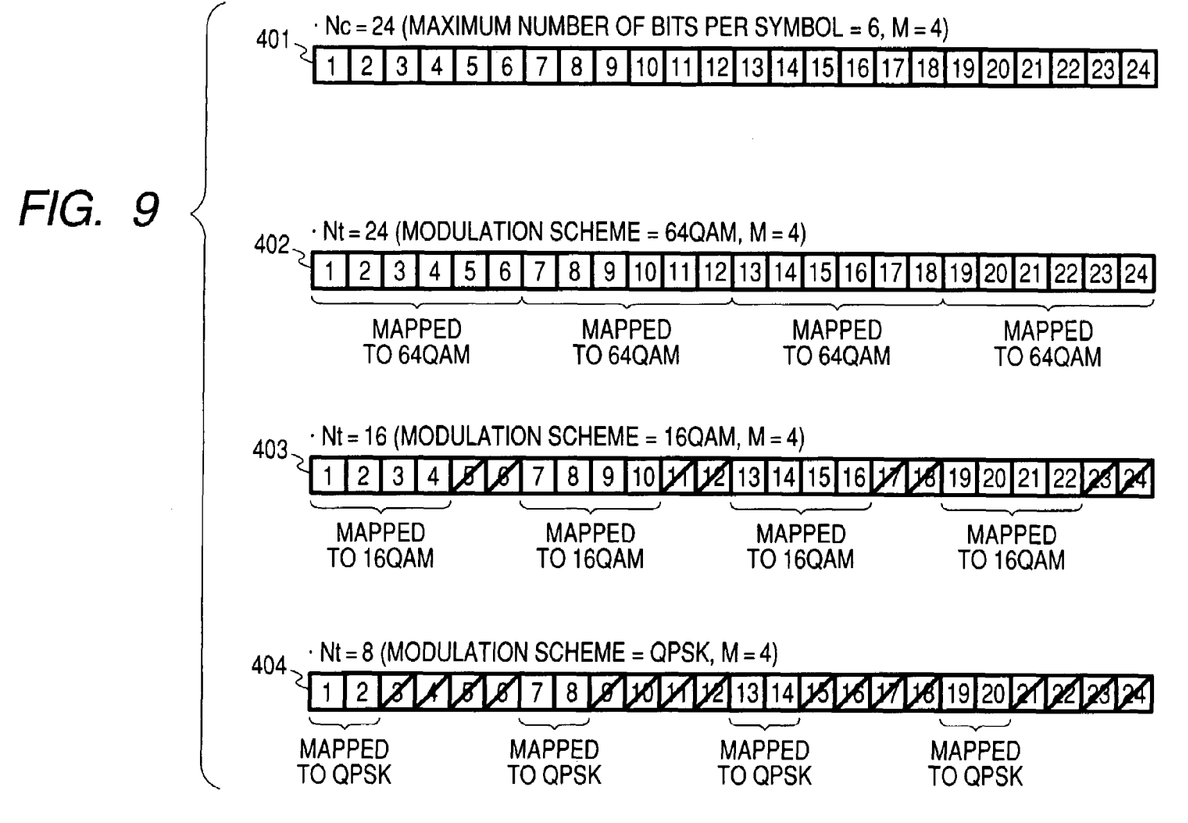
FIG. 9 illustrates an example of codeword mapping to modulation symbol in the present invention.

A relationship between each number of bits and mapping will be explained with reference to FIG. 9. When the number of modulation symbols M per subframe is set, for example, to 4, a codeword is divided and assigned in 24 bits (=6×4) to each subframe. In FIG. 9, 401 is a schematic diagram illustrating a profile of such division and assignment. Numeral in each frame indicates the bit number counted from the leading frame of the subframe.

In FIG. 9, 402 illustrates a profile of modulation using 64 QAM in each symbol of the subframe. In this modulation, the 24 bits assigned to the subframe are used, sequentially for each symbol, in every six bits as the number of propagation bits per symbol of 64 QAM. Here, a younger number bit is assigned to a more significant bit of modulation symbol of 64 QAM.

In FIG. 9, 403 illustrates a profile of modulation using 16 QAM in each symbol of the subframe. In this 16 QAM modulation, 24 bits assigned to subframe are divided in every six bits as the maximum number of propagation bits per symbol, and thereafter the four bits of younger bit numbers in the respective division unit are assigned. Here, two bits not assigned are not used for transmission and are then cancelled. In addition, among the assigned four bits, a younger number bit is assigned to a more significant bit of modulation symbol of 16 QAM.

In FIG. 9, 404 illustrates a profile of modulation using QPSK in each symbol of the subframe. In this QPSK modulation, 24 bits assigned to the subframe are divided into every six bits as the maximum number of propagation bits per symbol and thereafter the two bits of younger bit numbers in the respective division unit are assigned. Here, two bits not assigned are not used for transmission and are then cancelled.

The bits cancelled in the profiles of 403 and 404 in FIG. 9 are similar to the punctured profile when the signal of zero likelihood is applied after the demodulation at the receiver station. This profile has the characteristic which is similar to that where coding rate of the channel code is varied.

Even in the case where any modulation scheme in which the number of bits per symbol is different is employed like the profiles 402, 403, and 404 in FIG. 9, the symbols are always partitioned at the same location. For example, the bits up to 12th bit from 7th bit mapped to the 2nd symbol of 64 QAM in the profile 402 of FIG. 9 are mapped to the 2nd symbol in any case in the profiles 403 and 404, or are not used. These are never mapped to the symbol other than the 2nd symbol. Therefore, even if the modulation scheme selected in the transmitter station side is different from that selected for demodulation in the receiver station, continuous error due to deviation generated in arrangement of bits is never generated.

Moreover, in the profile 402 where the large number of bits are used for each symbol, the younger number bits assigned to the more significant bits are used in the profiles 403 and 404 where less number of bits are used for each symbol. Therefore, when modulation is executed with 64 QAM like the profile 402 in the transmitter station side and demodulation is executed with 16 QAM like the profile 403 in the receiver station side, useless transmitting power as much as assignment of less significant bits is generated for transmission, but information as much as the number of bits obtained through demodulation with the selected modulation scheme can be extracted without any problem at the receiver station side. In addition, a degree of freedom for control of modulation scheme can be improved because difference between the modulation scheme in the transmitter station and that during demodulation in the receiver station does not lead to large deterioration in characteristic.

As explained above, the partitioning position of the symbol is not changed without relation to the number of propagation bits per symbol of the modulation scheme used, and the bits used for modulation in the modulation scheme where the number of propagation bits per symbol is small are assigned to the more significant bits when the modulation scheme where a large number of propagation bits are used for each symbol is utilized. Accordingly, the adaptive modulation which can switch individually the modulation scheme in the transmitter station and receiver station in accordance with variation in the propagation channel can be realized.

Moreover, in the following explanation, channel encoding process means, in addition to the mapping process using the codes, for example, such as convolution code, Turbo code and LDPC code, the processes including addition of error detection information such as CRC and parity bit, adjusting process of code length by puncturing and repetition, and interleave process, and a codeword indicates a bit string obtained after these processes. Similarly, channel decoding process means the process for obtaining codeword through demodulation at the receiver station and the process for regenerating information bit before the channel encoding from the likelihood information of each bit of the codeword, and includes regeneration of the adjusting process of code length such as deinterleaving process, puncturing and repetition and decision of error using the error detecting information or the like.

In the following schematic diagrams and explanation on the basis of these schematic diagrams, the codeword is divided into six subframes for transmission, but the number of division is never limited only to six and the codeword may be divided with any natural number equal to or larger than two.

Figure 1:
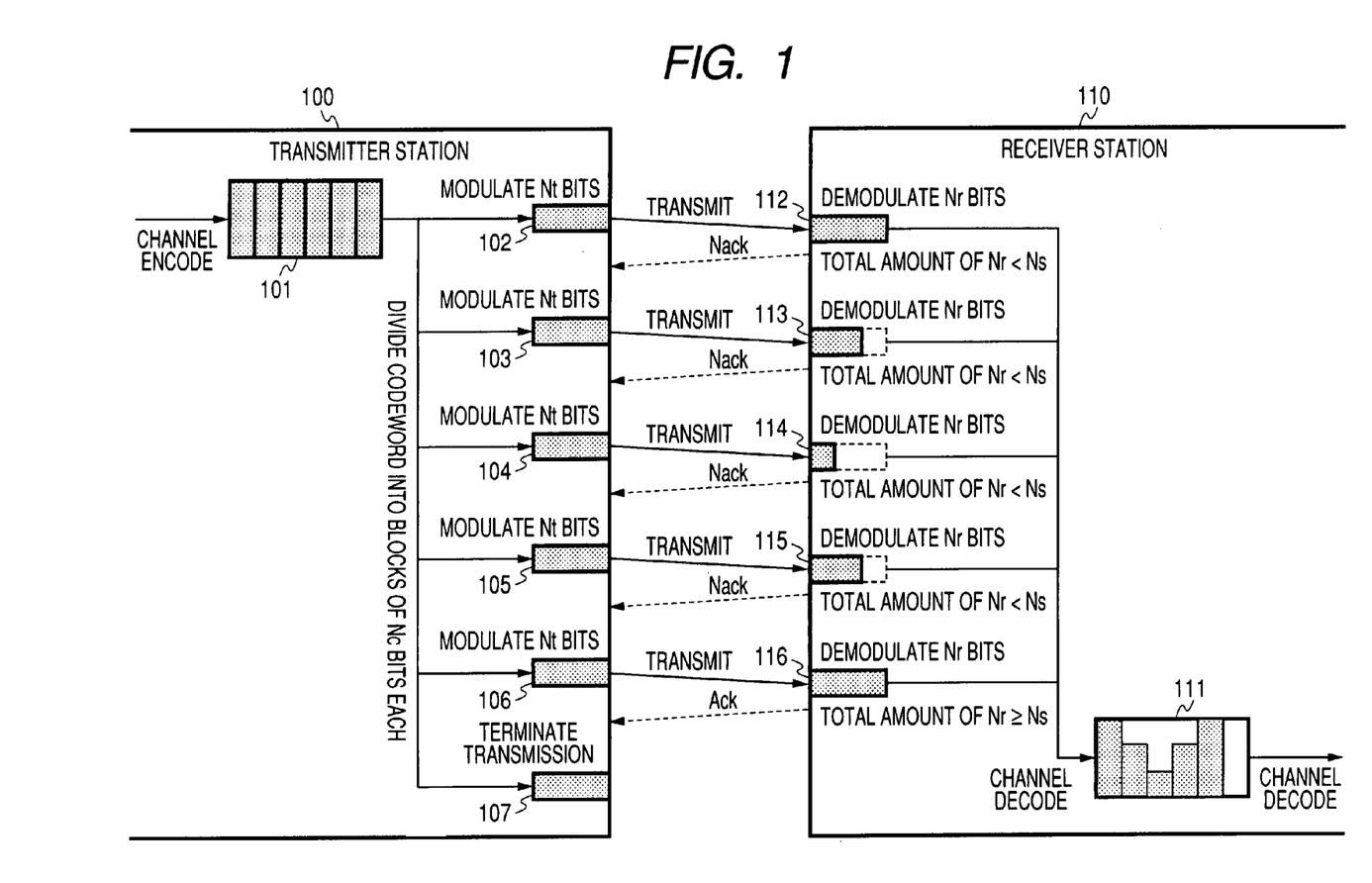
FIG. 1 illustrates an example of a first embodiment of an adaptive modulation scheme and a coding rate control method in the present invention.

FIG. 1 is a schematic diagram of signal processing flows in an example of a first embodiment of the present invention. As the first embodiment, an example for deciding whether the channel decoding should be executed or not and transmission of codeword should be terminated or not in the receiver station under the condition that the number of bits Nt per symbol for modulation is fixed and the number of bits Nr per symbol for demodulation is variable will be explained. In the adaptive modulation scheme and coding rate control method in the first embodiment of the present invention, a transmitter station 100 encodes first the data to be transmitted using channel code to generate a codeword 101 and divides the codeword 101 into subframes wherein each subframe is formed of Nc bits.

The maximum number of propagation bits Nc per symbol in the modulation scheme may be set to a fixed value in the system as a whole for the common use between the transmitter station and receiver station. Moreover, it is also possible that propagation bits is broadcasted as the characteristic information of a base station (transmitter station or receiver station) and these propagation bits are received by and stored in a terminal (receiver station or transmitter station) at the time of hand-over and location registration. Moreover, the maximum number of propagation bits Nc per symbol in the modulation scheme may also be included into a control signal exchanged at the time of connecting process.

In addition, the receiver station determines the number of receiving bits Ns required for channel decoding in order to decode the codeword 101 in the predetermined probability. A value of Ns can be obtained, for example, by selecting the coding rate required for satisfy the predetermined communication characteristic from the relationship between power of each bit and communication characteristic such as error rate under the condition that propagation channel quality is not varied and by dividing the number of information bits before channel encoding with the selected coding rate. As an example, in the case where the information of 100 bits is encoded to Nc=300 through the channel encoding with the code in the coding rate of ⅓, a value of Ns is set to 200 which is obtained by dividing the original number of information bits 100 with ½. Accordingly, even when the propagation channel quality varies, the characteristic which is almost similar to that obtained by using the code in the coding rate of ½ when the propagation channel quality is not varied, can also be attained.

In FIG. 1, in the timing 102 in FIG. 1 for transmitting a first subframe, the transmitter station generates a modulation symbol using the Nt bits determined with the modulation scheme employed among the Nc bits information assigned to the subframe, and transmits the modulation symbol to the receiver station. The receiver station receives the first subframe in the timing 112 in FIG. 1, demodulates the same with the selected modulation scheme in accordance with the propagation channel quality measured, and obtains the demodulation result of Nr bits. In the receiver station, a value of Nr accumulated from start of reception of the codeword is compared with the Ns determined as the number of bits required for channel decoding. When the total amount of Nr is proved smaller than the value of Ns as a result of comparison, it means that the number of bits required for channel decoding in the predetermined probability is not received and the Nack signal indicating that reception is not yet completed is sent to the transmitter station. The transmitter station executes again, upon reception of the Nack signal, the transmission in the timing 103 in FIG. 1 with the similar manner as that in the timing 102, and the receiver station also repeats the receiving processes in the timing 113 in FIG. 1 in the same manner as that in the timing 112 until the total amount of Nr becomes equal to or larger than Ns.

When the total amount of Nr at the receiver station becomes equal to or larger than Ns and when reception of all subframes attained by dividing codeword is completed, the receiver station transmits the Ack signal indicating termination of reception to the transmitter station and performs the channel decoding process by gathering the signals demodulated in the past. If the number of bits obtained as a result of demodulation is smaller than the codeword length, the channel decoding process is conducted after addition of the signal of zero likelihood. Moreover, in the timing where the Ack signal is received, the transmitter station terminates transmission of the codeword corresponding to the relevant Ack signal, enabling control of adaptive modulation in accordance with propagation channel quality and control of coding rate in accordance with the modulation scheme for actual propagation capability.

Structure of transmitter station and signal processing flow thereof in a first embodiment of the present invention will then be explained with reference to FIG. 2.

Figure 2:
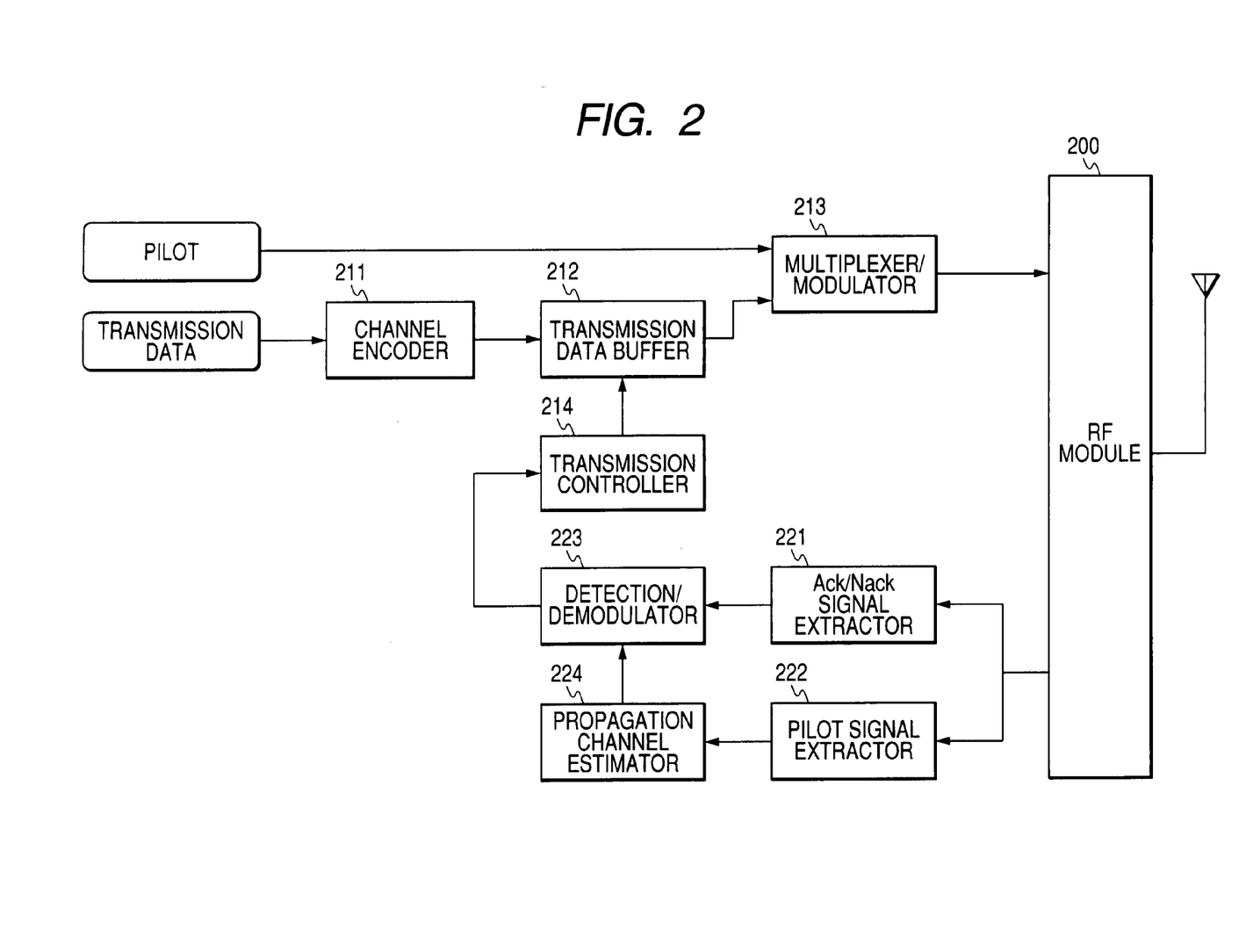
FIG. 2 illustrates an example of a transmitter station in an example of a first embodiment of the present invention.

In the transmitter station of FIG. 2, the transmitting data is encoded first in a channel encoder 211 and is then accumulated in a transmitting data buffer 212. The signal accumulated in the transmitting data buffer 212 is divided into subframes. These subframes are inputted to a multiplexer/modulator 213 when continuation of transmission is instructed from a transmission controller 214 and an instruction from the transmission controller 214 for the initial transmission or the like is not issued. The subframes inputted to the multiplexer/modulator 213 are multiplexed in combination with a pilot signal and is then transmitted from an RF (Radio-Frequency) module 200 through modulation with the predetermined modulation scheme.

Moreover, in the transmitter station in FIG. 2, the pilot signal among the signals received in the RF module 200 is extracted with a pilot signal extractor 222 and the amplitude and phase variation information in the propagation channel obtained with a propagation channel estimator 224 are sent to a detection/demodulator 223. Moreover, the Ack/Nack signals among those received in the RF module 200 are extracted with an Ack/Nack signal extractor 221 and demodulated in the detection/demodulator 223 using the amplitude and phase variation information obtained in the propagation channel estimator 224. The demodulation result is then sent to the transmission controller 214. The transmission controller 214 transmits, to the transmission data buffer 212, termination of transmission of the subframes of the relevant codeword when the demodulation result transmitted is Ack and continuation of transmission of the subframes of the relevant codeword when the demodulation result transmitted is Nack. Signal processing flow in the transmitter station as the first embodiment of the present invention is realized as explained above.

Structure and signal processing flow of the receiving station in the first embodiment of the present invention will be explained with reference to FIG. 3.

Figure 3:
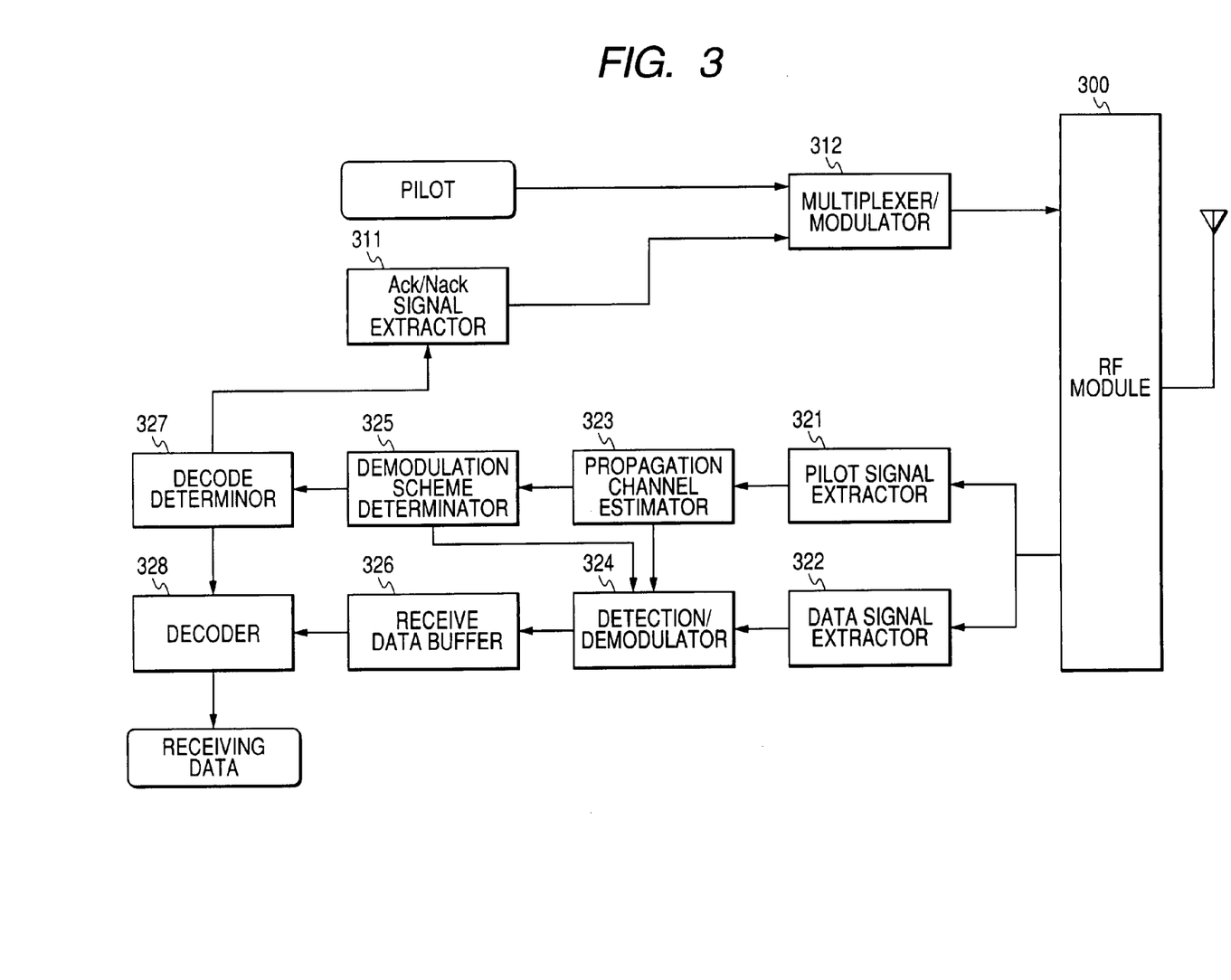
FIG. 3 illustrates an example of a receiver station in an example of the first embodiment of the present invention.

In the receiver station in FIG. 3, the pilot signal, among the signals received in the RF module 300, is extracted in the pilot extractor 321, and the amplitude and phase variation information in the propagation channel obtained with the propagation channel estimator 323 are sent to the detection/demodulator 324. The propagation channel estimator 323 also estimates propagation channel quality based on the pilot signal received and sends the estimation result to a demodulation scheme determiner 325. The demodulation scheme determiner 325 selects a modulation scheme so as to increase the number of propagation bits per symbol as the propagation channel quality becomes higher in accordance with the propagation channel quality, and sends the selected modulation scheme to the detector/demodulator 324. Moreover, the demodulation scheme determiner 325 sends, to a decoding determiner 327, the total sum Nr of the number of propagation bits per symbol in the selected modulation scheme for all symbols in the subframe. The decoding determiner 327 accumulates the total sum Nr of the number of propagation bits transmitted for the codeword being received, and compares the accumulation result with the number of bits Ns required for the decoding. When the accumulation result is small, the decoding determiner 327 sends the accumulation result to a Ack/Nack signal generator 311 to generate the Nack signal. When the accumulation result is equal to Ns or larger than Ns and when reception of all subframes divided from the codeword being received is terminated, the Ack/Nack signal generator 311 is instructed to generate the Ack signal and the channel decoding is instructed to the channel decoder 328.

Meanwhile, the data among the signals received in the RF module 300 is extracted by a data extractor 322 and the detection/demodulator 324 executes the channel demodulation process in accordance with the modulation scheme sent from the demodulation scheme determiner 325 using the amplitude and phase variation information of the propagation channel sent from the propagation channel estimator 323, and then accumulates the result of demodulation process to the receiving data buffer 326. In this time, when the number of propagation bits per symbol in the modulation scheme sent from the demodulation scheme determiner 325 is smaller than the maximum number of propagation bits per symbol, the signal of zero likelihood is added to a difference. The receiving data buffer 326 accumulates, for each subframe, the likelihood information for Nr bits obtained as a result of demodulation process and the likelihood information for Nc bits as the maximum number of propagation bits per subframe in combination with the loaded signal of zero likelihood. The channel decoder 328, which is instructed to execute channel decoding from a decoding determiner 327, receives the information stored in the receiving signal buffer 326 and generates the receiving data through the decoding process.

The receiver station in FIG. 3 generates the Ack signal or Nack signal instructed from the decoding determiner 327 in the Ack/Nack generator 311, modulates the signal in the multiplexer/demodulator 312 together with the pilot signal, and transmits the signal to the transmitter station via the RF module 300 to terminate the signal process in the receiver station to realize an example of the first embodiment of the present invention.

In the first embodiment of the present invention, both Ack and Nack signals are sent to the transmitter station from the receiver station. However, it is also possible that only the Ack signal is actually transmitted to the transmitter station from the receiver station and the Nack signal is not transmitted, and that the transmitter station determines, when it does not receive the Ack signal, in the same manner as the case where the Nack signal is received.

Figure 4:
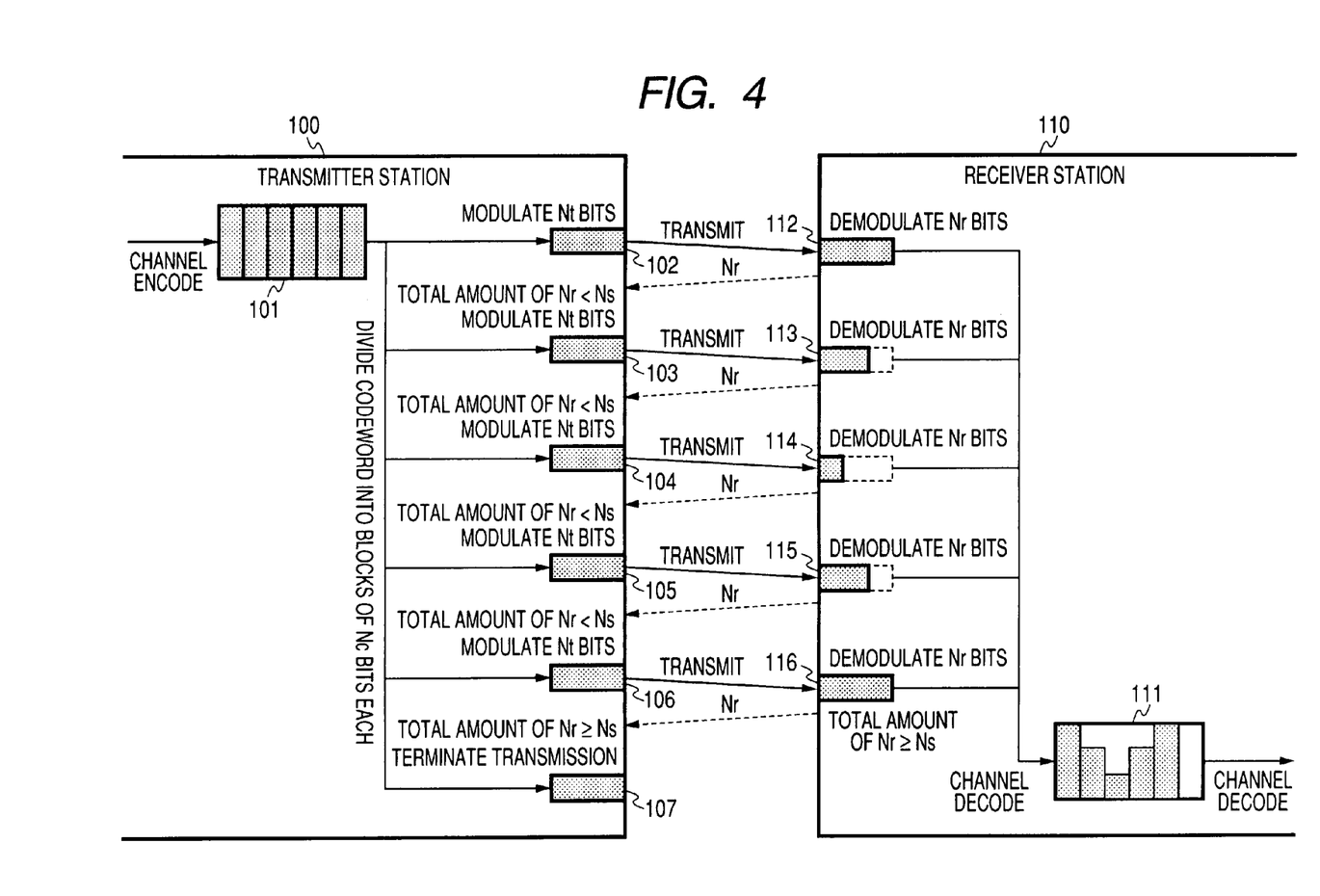
FIG. 4 illustrates an example of a second embodiment of the adaptive modulation scheme and coding rate control method in the present invention.

FIG. 4 is a schematic diagram illustrating signal processing flows in an example of a second embodiment of the present invention. In the second embodiment, the number of bits Nt for each symbol for the modulation is fixed and the number of bits for each symbol for the demodulation is variable. Moreover, the receiving station determines whether channel decoding of the receiving should be executed or not, while the transmitter station determines whether transmission of codeword should be terminated or not. In the adaptive modulation scheme and the coding rate control method in the second embodiment of the present invention, the transmitting station 100 encodes first the data to be transmitted with channel code to generate codeword 101 and divides this codeword 101 into subframes where each subframe is formed of Nc bits. Moreover, the receiver station determines the number of receiving bits Ns required for the channel decoding as in the case of the first embodiment in view of decoding the generated codeword 101 in the predetermined probability.

The processing flows up to the transmitting process of each subframe to the receiver station from the transmitter station and the decoding process in the receiver station are executed, even in the example of the second embodiment, in the same manner as the example of the first embodiment. However, as the signal sent to the transmitter station from the receiver station, the receiver station sends a value of the number of bits Nr obtained as the result of demodulation or a code as the index indicating a value of Nr to the transmitter station, unlike the first embodiment. In the example of the second embodiment of the present invention, the transmitter station can realize control of coding rate in accordance with the modulation scheme for actual propagation capability by accumulating the sent value of Nr and terminating the transmission when the accumulation result becomes equal to or larger than Ns.

Structure and signal processing flows of the transmitter station in the second embodiment of the present invention will be explained with reference to FIG. 5.

Figure 5:
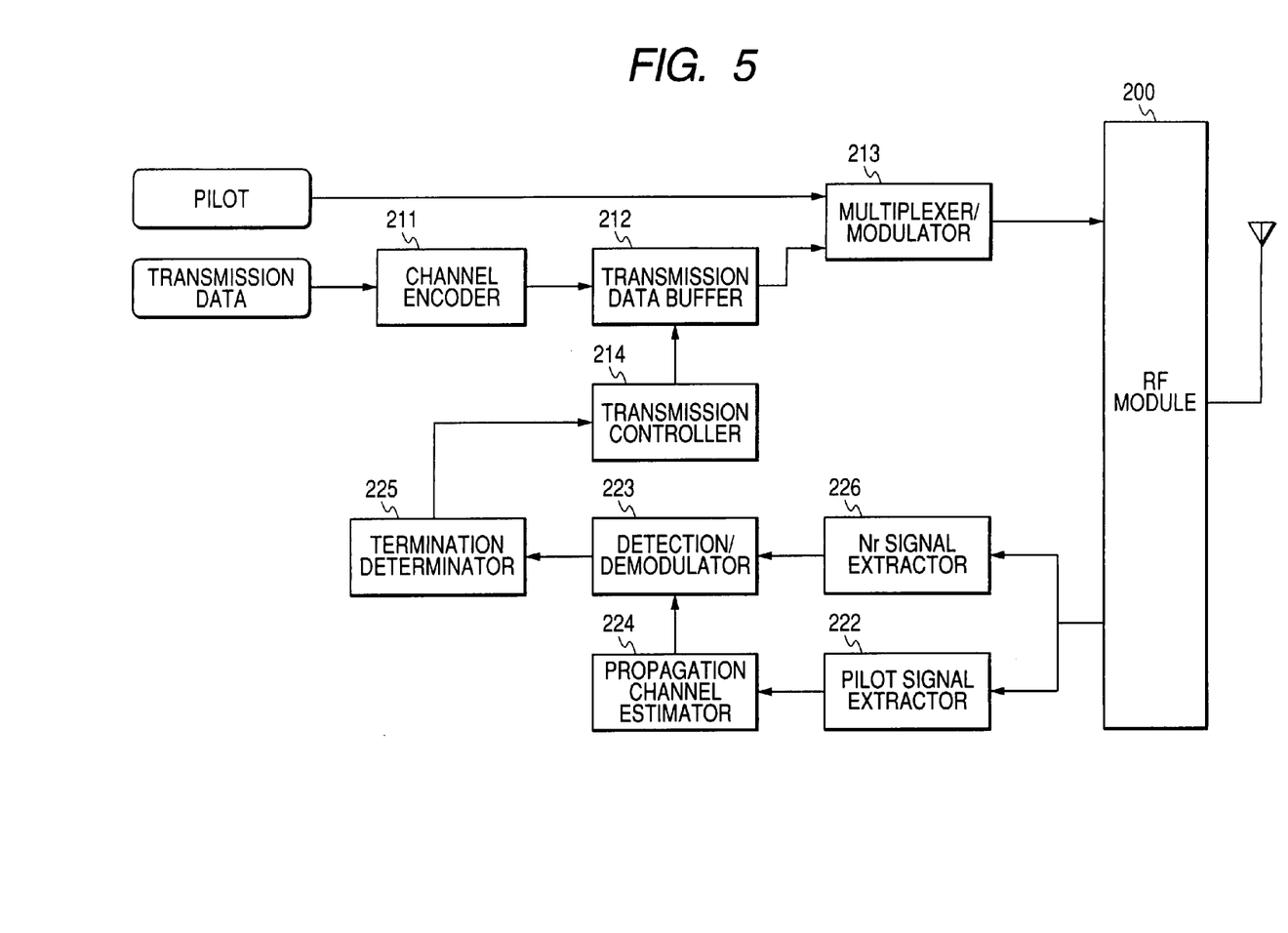
FIG. 5 illustrates an example of the transmitter station in the second embodiment of the present invention.

In the transmitter station of FIG. 5, the transmitting data is encoded first in the channel encoder 211 and is then accumulated in the transmitting data buffer 212. The signal accumulated in the transmitting data buffer 212 is divided into subframes, then inputted to the multiplexer/demodulator 213 when continuation of transmission is instructed from the transmission controller 214 and when an instruction from the transmission controller 214 in the initial transmission or the like is not issued, multiplexed with the pilot signal, and is then transmitted from the RF module 200 through modulation with the predetermined modulation scheme.

Moreover, in the transmitting station in FIG. 2, the pilot signal among the signals received by the RF module 200 is extracted with the pilot signal extractor 222 and the amplitude and phase variation information in the propagation channel are obtained with the propagation channel estimator 224 and are then sent to the detection/demodulator 223. Moreover, the Nr signal among the signals received by the RF module 200 is extracted with the Nr signal extractor 221 and demodulated in the detection/demodulator 223 using the amplitude and phase variation information obtained with the propagation channel estimator 224. The demodulation result is sent to the termination determiner 225. The termination determiner 225 accumulates the value of Nr as the number of bits obtained as a result of demodulation of the subframe in the receiver station based on the Nr signal, and determines whether the accumulation result is equal to or larger than Ns. Result of determination is sent to the transmission controller 214. The transmission controller 214 sends, in accordance with the determination result sent, termination of transmission of subframe of the relevant codeword when the accumulation result is equal to or larger than Ns, or sends continuation of transmission of subframe of the relevant codeword to the transmitting signal buffer 212 when the accumulation result is not larger than Ns.

Next, structure and signal processing flows of the receiver station of the second embodiment of the present invention will be explained with reference to FIG. 6.

Figure 6:
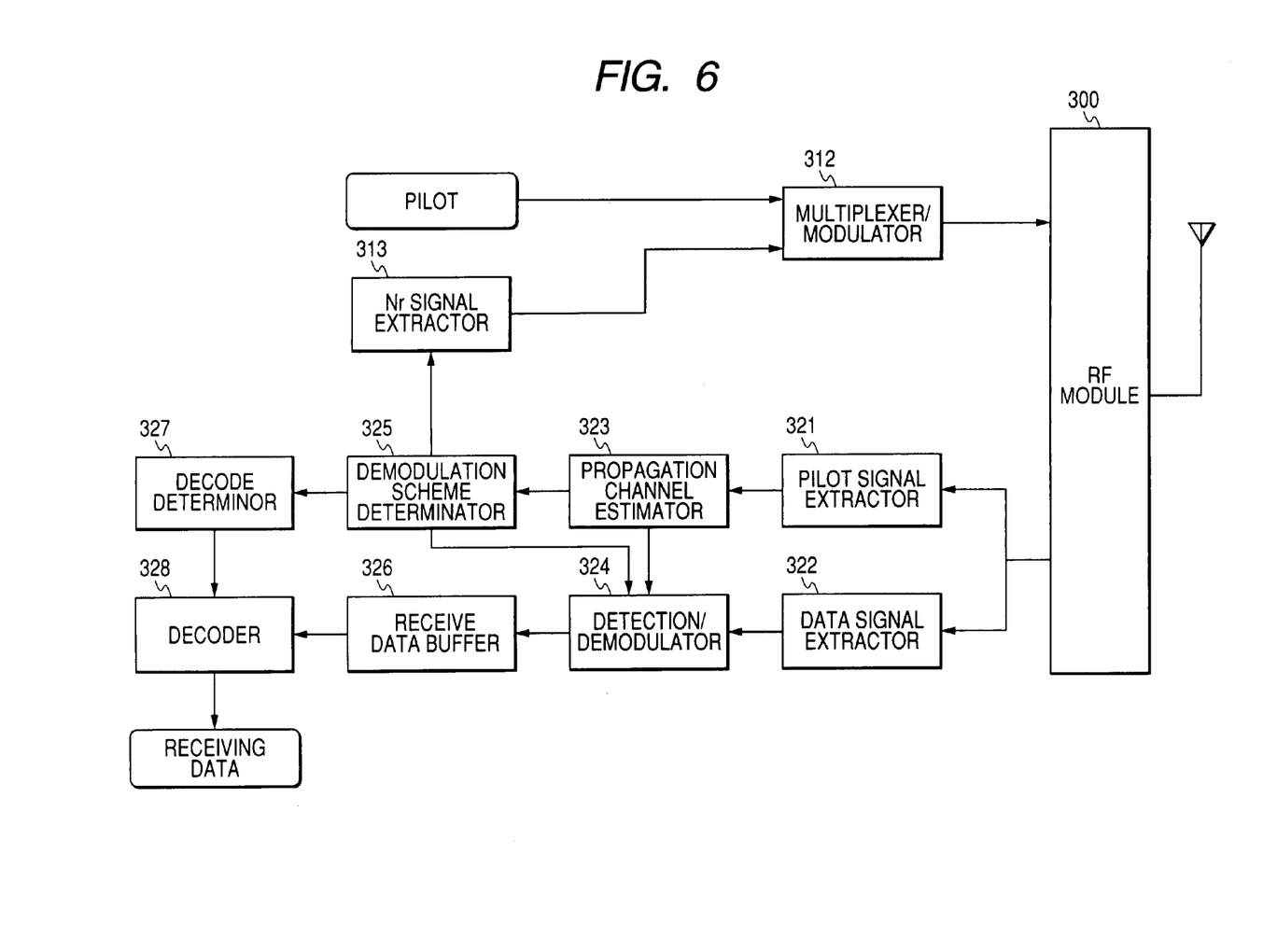
FIG. 6 illustrates an example of the receiver station in the second embodiment and a third embodiment of the present invention.

In the receiver station in FIG. 6, the pilot signal among the signals received at the RF module 300 is extracted in the pilot signal extractor 321 and the amplitude and phase variation information in the propagation channel obtained with the propagation channel estimator 323 are sent to the detection/demodulator 324. The propagation channel estimator 323 also estimates propagation channel quality based on the received pilot signal and sends the estimation result to the demodulation scheme determiner 325. The demodulation scheme determiner 325 selects the modulation scheme so as to increase in the number of propagation bits per symbol as the propagation channel quality becomes higher in accordance with this propagation channel quality, and sends the selected modulation scheme to the detection/demodulator 324. Moreover, the demodulation scheme determiner 325 sends the total sum Nr of the number of propagation bits per symbol of the selected modulation scheme for all symbols in the subframe to a Nr signal generator 313 and decoding determiner 327. This decoding determiner 327 accumulates the codewords receiving the total sum Nr of the number of propagation bits sent, compares the accumulation result with the number of bits Ns required for the decoding process, and instructs the channel decoder 328 to execute-the channel decoding process when the accumulation result is equal to or larger than Ns and when the codeword receiving the propagation bits terminates reception of all subframes divided.

On the other hand, the data among the signals received in the RF module 300 is extracted in a data signal extractor 322, conducts the channel decoding process, in the detection/demodulator 324, in accordance with the modulation scheme sent from the demodulation scheme determiner 325 using the amplitude and phase variation information in the propagation channel sent from the propagation channel estimator 323, and accumulates the result of demodulation process to the receiving data buffer 326. In this time, when the number of propagation bits per symbol in the modulation scheme sent from the demodulation scheme determiner 325 is less than the maximum number of propagation bits per symbol, the signal of zero likelihood is added to difference. The receiving data buffer 326 accumulates the likelihood information as much as Nr bits obtained as a result of demodulation process per subframe and the likelihood information as much as Nc bits indicating the maximum number of propagation bits per subframe in combination with the loaded signal of zero likelihood. The channel decoder 328 receives, when the channel decoding is instructed from the decoding determiner 327, the information accumulated in the receiving data buffer 326 and generates the receiving data through the channel decoding process.

Moreover, in the receiver station of FIG. 6, the Nr signal generator 313 generates the value of Nr itself or the code indicating the value of Nr as the Nr signal on the basis of the value of Nr sent from the demodulation determiner 325, the multiplexer/demodulator 312 modulates this Nr signal together with the pilot signal, and the modulated signals is transmitted to the transmitter station through the RF module 300. Thereby, the signal processes in the receiver station terminates in order to realize the example of the second embodiment of the present invention.

In the second embodiment, since the number of bits Nr per symbol on the occasion of demodulation is used for both determination of the modulation scheme and determination of transmission termination of the codeword, the control signal to be transmitted to the transmitter station from the receiver station can be reduced.

Figure 7:
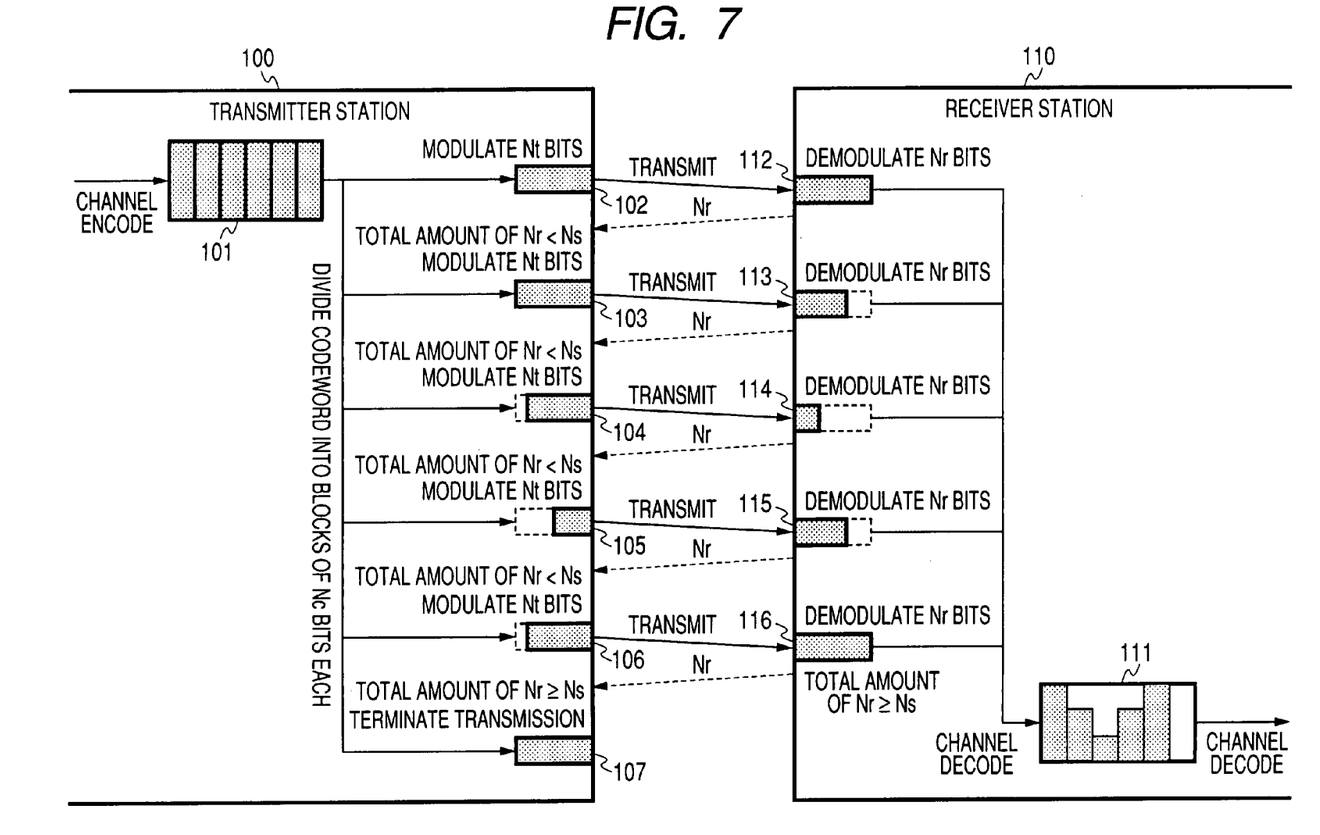
FIG. 7 illustrates an example of the third embodiment of the adaptive modulation scheme and coding rate control method in the present invention.

Moreover, FIG. 7 is a schematic diagram illustrating signal process flows in an example of a third embodiment of the present invention.

In the third embodiment, both number of bits Nt used for modulation for each subframe and the number of bits Nr obtained through demodulation of each subframe are variable. Whether transmission of the number of bits Nt and codeword used for modulation of each subframe should be terminated or not is determined by the transmitter station. The number of bits Nr through demodulation of each subframe and whether demodulation of the receiving signal should be conducted or not are determined in the receiver station. The example of the third embodiment of the present invention conducts the processes similar to that in the example of the second embodiment of the present invention, except for the point that the transmitter station controls the modulation scheme in accordance with the Nr information sent from the receiver station. In the example of the third embodiment of the present invention, the transmitter station uses the modulation scheme in which the number of propagation bits is larger as the Nr value is larger, or the modulation scheme in which the number of propagation bits is smaller as the Nr value is smaller, at the time of modulating the transmitting signal by utilizing the Nr sent from the receiver station. Excellent characteristic can be obtained when variation in the propagation channel is gradual, for example, by selecting the modulation scheme to make identical the Nr value sent from the receiver station or the average value of a plurality of Nr values in the past to the Nt value in the transmitter station. In addition, by selecting the modulation scheme such that the value of Nt in the transmitter station is equal to or larger than the Nr sent from the receiver station or the average value of a plurality of Nr values in the past, excellent characteristic can be obtained particularly when variation in the propagation channel is intense. Whether the variation in the propagation channel is gradual or intense can be determined as follows. For example, when the variation in a plurality of Nr values in the past is small, the variation in the propagation channel is determined as gradual but when the variation in the Nr values is large, the variation in the propagation channel is determined as intense.

Structure and signal processing flows of the transmitter station in the third embodiment of the present invention will be explained with reference to FIG. 8.

Figure 8:
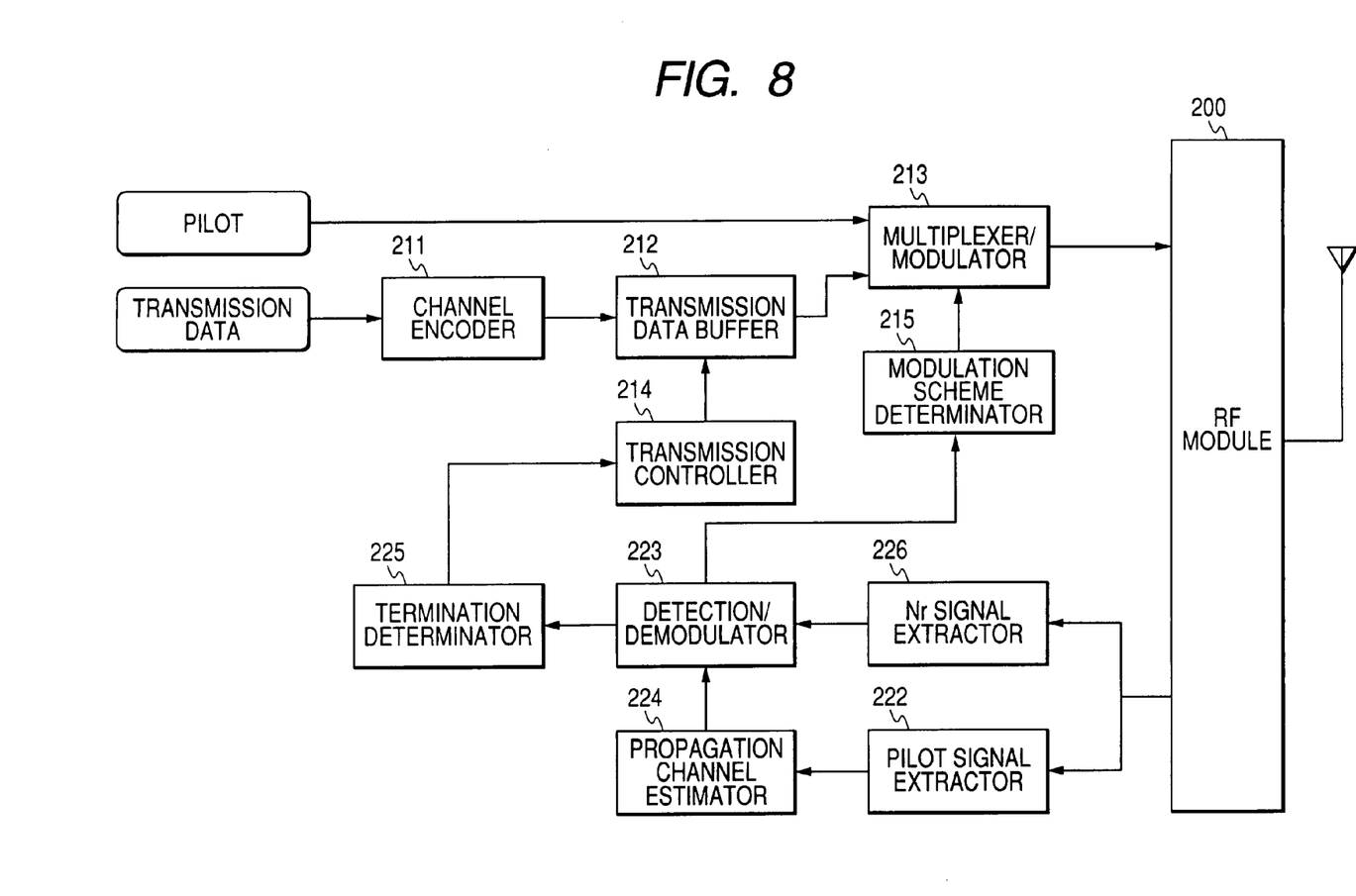
FIG. 8 illustrates an example of the transmitter station in an example of the third embodiment of the present invention.

In the transmitter station of FIG. 8, the transmitting data is encoded first in the channel encoder 211 and is then accumulated to the transmitting data buffer 212. The signal accumulated in the transmitting data buffer 212 is divided into subframes, inputted to the multiplexer/demodulator 213 when continuation of transmission is instructed from the transmission controller 214 and when an instruction from the transmission controller 214 for initial transmission or the like is not issued, multiplexed with the pilot signal, and is then transmitted from the RF module 200 through modulation with the modulation scheme supported by the modulation scheme determiner 215 or with the predetermined modulation scheme.

Moreover, in the transmitter station of FIG. 2, the pilot signal among the signals received in the RF module 200 is extracted in the pilot signal extractor 222, and the amplitude and phase variation information in the propagation channel are obtained in the propagation channel estimator 224 and then sent to the detection/demodulator 223. Moreover, the Nr signal among the signals received in the RF module 200 is extracted in the Nr signal extractor 221 and demodulated in the detection/demodulator 223 using the amplitude and phase variation information obtained in the propagation channel estimator 224. The demodulation result is then sent to the termination determiner 225 and the modulation scheme determiner 215. This termination determiner 225 accumulates the Nr value as the number of bits obtained as a result of demodulation of subframe in the receiver station based on the Nr signal and sends, to the transmission controller 214, the result of determination whether the accumulation result is equal to or larger than Ns. The transmission controller 214 sends instructions in accordance with the sent result of determination to the transmitting signal buffer 212, namely, termination of transmission of subframe of the relevant codeword in the case where the accumulation result is determined as equal to or larger than Ns or continuation of transmission of subframe of the relevant codeword in the other cases. Moreover, the modulation scheme determiner 215 obtains the Nr information as the number of bits obtained as a result of demodulation of subframe in the receiver station on the basis of the Nr signal, selects the modulation scheme in which the number of propagation bits per symbol is larger as the Nr value is larger or the modulation scheme in which the number of propagation bits per symbol is smaller as the Nr value is smaller, and then sends the selected modulation scheme to the multiplexer/demodulator 213. Thereby, the signal processes terminate to realize the example of the third embodiment of the present invention.

Next, structure and signal processing flows of the receiver station in the example of the third embodiment of the present invention may be similar to the structure and signal processing flows of the receiver station in the example of the second embodiment of FIG. 2.

According to the third embodiment, the transmitter station is capable of modulating signals with the modulation scheme in accordance with propagation channel quality. Therefore, when propagation channel quality is rather bad, less number of bits are transmitted and it is no longer required to share the transmitting power to less significant bits which cannot be received correctly in the receiver station side. Accordingly, an information transmitting amount per power consumption is enhanced. Moreover, since the number of bits Nr per symbol on the occasion of demodulation is used for both determination of the modulation scheme and determination of transmission termination of codeword, the control signals transmitted to the transmitter station from the receiver station can be reduced.

Moreover, in the third embodiment, it is also possible that the propagation channel quality between both stations is estimated using the pilot signal transmitted from the receiver station instead of use of the number of bits Nr per symbol on the occasion of the demodulation for determination of the modulation scheme and the modulation scheme is determined on the basis of the estimated propagation channel quality.

In the example of embodiments of the present invention described above, coding rate has been controlled on the basis of the number of propagation bits per symbol in the modulation scheme used for demodulation determined based on the propagation channel quality in the receiver station, but this coding rate control is not in the exclusive relationship with the coding rate control by the HARQ and may be implemented simultaneously with the coding rate control based on the HARQ by adding the HARQ utilizing existence or non-existence of error in the decoding result in the example of the embodiments of the present invention. Moreover, re-transmission control utilizing existence or non-existence of error in the decoding result may also be added.

The present invention described above realizes the adaptive modulation which can individually switch the modulation scheme in the transmitter station and receiver station in accordance with variation in the propagation channel by not changing partition of symbols without relation to the number of propagation bits per symbol of the modulation scheme used and by assigning the bits used in the modulation with the modulation scheme in which the number of propagation bits per symbol is small to the more significant bits on the occasion of utilizing the modulation in which the number of propagation bits per symbol is large. Moreover, the present invention also realizes, with the simplified processes, communications in the stable quality following variations in the propagation channel by controlling the effect of increasing the coding rate as a result of such adaptive modulation through the coding rate control based on the number of bits obtained by the demodulation.

What is claimed is:

1. A radio communication system comprising:
   a first radio station for dividing a codeword generated through a channel encoding by the channel code to transmit the codeword; and
   a second radio station for combining and decoding the received signals, wherein
   said first radio station and said second radio station use in common information of a first number of bits as a maximum number of propagation bits per symbol,
   said first radio station generates a codeword by encoding the transmitting information, assigns and divides said codeword to result in said first number of bits per symbol, and transmits the bits through modulation thereof with a modulation scheme which can transmit, for each symbol, a second number of bits which is a value equal to or less than said first number of bits using at least a part of said assigned bits, and
   said second radio station determines a propagation channel quality from said first radio station, receives the signals from said first radio station, demodulates said received signal with a modulation scheme which can transmit, for each symbol, a third number of bits which is the value equal to or less than said first number of bits and the value having positive correlation with said propagation channel quality, and combining and decoding said received signal when an accumulation result of said third number of bits for said codeword has exceeded a predetermined value.

2. The radio communication system according to claim 1, wherein said second radio station transmits a notifying signal for notifying end of reception when the accumulation result of said third number of bits for said codeword has exceeded said predetermined value, and
   said first radio station suspends transmission of said codeword, upon reception of said notifying signal.

3. The radio communication system according to claim 1, wherein said second radio station sends said third number of bits to said first radio station, and
   said first radio station accumulates said third number of bits sent and suspends transmission of said codeword when the accumulation result of said third number of bits for said codeword has exceeded said predetermined value.

4. The radio communication system according to claims 1, wherein said first radio station determines the propagation channel quality for said second radio station and sets said second number of bits as the value having positive correlation with said determined propagation channel quality.

5. The radio communication system according to claim 4, wherein said second radio station sends said third number of bits to said first radio station, and
   said first radio station determines said propagation channel quality on the basis of said sent third number of bits.

6. A communication method of signal transmitter station in the radio communication system in which a channel decoding is conducted when an accumulation result of the number of bits demodulated for each codeword has exceeded a predetermined value in a signal receiver station, wherein
   information of a first number of bits as a maximum number of propagation bits per symbol in a modulation scheme is used in common with said signal receiver station,
   each codeword is generated by encoding transmitting information,
   said codeword is assigned and divided to result in said first number of bits per symbol,
   a second number of bits as the value equal to or less than said first number of bits is modulated with a modulation scheme which can transmit the bits for each symbol using at least a part of said assigned bits,
   said modulated signal is transmitted,
   the information of number of bits demodulated in said signal receiver station is received from said signal receiver station, and
   termination or continuation of the transmission processes of the codeword is determined on the basis of said information of number of bits demodulated.

7. The communication method according to claim 6, wherein the information of number of demodulated bits received from said signal receiver station indicates whether the result of accumulation of number of bits per symbol in the modulation scheme selected for the demodulation process in said signal receiver station has exceeded the predetermined value or not.

8. The communication method according to claim 6, wherein the information of number of demodulated bits received from said signal receiver station indicates the number of bits per symbol in the modulation scheme selected for the demodulation process in said signal receiver station, and said signal transmitter station accumulates said information of number of demodulated bits for each codeword and terminates transmission of said codeword when said accumulation result has exceeded the predetermined value.

9. The communication method according to claims 8, wherein said modulation scheme of the transmitting information is selected on the basis of said information of number of bits demodulated in said signal transmitter station.

* * * * *